(12) United States Patent
Li et al.

(10) Patent No.: US 12,542,640 B2
(45) Date of Patent: Feb. 3, 2026

(54) TIME DOMAIN RESOURCE DETERMINATION METHOD, DEVICE AND MEDIUM

(71) Applicant: ZTE CORPORATION, Shenzhen (CN)

(72) Inventors: Jian Li, Shenzhen (CN); Peng Hao, Shenzhen (CN); Yiwei Deng, Shenzhen (CN); Xingguang Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 782 days.

(21) Appl. No.: 17/758,099

(22) PCT Filed: Dec. 30, 2020

(86) PCT No.: PCT/CN2020/141200
§ 371 (c)(1),
(2) Date: Jun. 28, 2022

(87) PCT Pub. No.: WO2021/139576
PCT Pub. Date: Jul. 15, 2021

(65) Prior Publication Data
US 2022/0376872 A1 Nov. 24, 2022

(30) Foreign Application Priority Data
Jan. 10, 2020 (CN) .......................... 202010026432.5

(51) Int. Cl.
*H04L 5/00* (2006.01)
(52) U.S. Cl.
CPC .......... *H04L 5/0053* (2013.01); *H04L 5/0048* (2013.01)

(58) Field of Classification Search
CPC ............. H04W 48/16; H04W 72/0446; H04W 72/046; H04W 16/28; H04W 72/0457;
(Continued)

(56) References Cited

U.S. PATENT DOCUMENTS

| | | | |
|---|---|---|---|
| 2020/0036558 A1* | 1/2020 | Shen | ...................... H04L 1/0038 |
| 2021/0119747 A1* | 4/2021 | Seo | .......................... H04L 25/03 |
| 2022/0264647 A1* | 8/2022 | Zhang | .................... H04L 5/0053 |

FOREIGN PATENT DOCUMENTS

| | | |
|---|---|---|
| CN | 110324109 A | 10/2019 |
| CN | 110351041 A | 10/2019 |

(Continued)

OTHER PUBLICATIONS

3GPP Technical Specification Group Radio Access Network. "Remaining aspects for rate matching," 3GPP TSG RAN WG1 Meeting, May 21-25, 2018, pp. 1-3.
(Continued)

*Primary Examiner* — Iqbal Zaidi
(74) *Attorney, Agent, or Firm* — Vivacqua Crane, PLLC

(57) ABSTRACT

A method and device for determining a time-domain resource, and a medium are disclosed. The method for determining a time-domain resource includes: obtaining a discontinuous control resource set (CORESET) signaling parameter in New Radio (NR); and determining discontinuous time-domain symbols according to the discontinuous CORESET signaling parameter and transmitting the discontinuous time-domain symbols to a terminal, where the discontinuous time-domain symbols are used as time-domain resources for carrying a physical downlink control channel (PDCCH).

15 Claims, 6 Drawing Sheets

(58) Field of Classification Search
CPC .... H04W 72/232; H04W 80/02; H04L 5/0048
See application file for complete search history.

(56) References Cited

FOREIGN PATENT DOCUMENTS

| | | |
|---|---|---|
| CN | 111901867 A | 11/2020 |
| WO | 2017111517 A1 | 6/2017 |
| WO | 2019029657 A1 | 2/2019 |
| WO | 2019051707 A1 | 3/2019 |

OTHER PUBLICATIONS

3GPP Technical Specification Group Radio Access Network. "Views on coverage enhancements in Rel-17," 3GPP TSG RAN Meeting, Dec. 9-12, 2019, pp. 1-3.
International Searching Authority. International Search Report and Written Opinion for PCT Application No. PCT/CN2020/141200 and English translation, mailed Mar. 31, 2021, pp. 1-13.
3GPP Technical Specification Group Radio Access Network. "On Wideband Operation for NR-U," 3GPP TSG RAN WG1 Meeting #97, May 13-17, 2019, pp. 1-4.
3GPP Technical Specification Group Radio Access Network. "Wideband Operation for NR-U," 3GPP TSG RAN WG1 Meeting #98, Aug. 26-30, 2019, pp. 1-6.
European Patent Office. Extended European Search Report for EP Application No. 20912324.9, mailed Jan. 16, 2024, pp. 1-60.

* cited by examiner

TIME DOMAIN RESOURCE DETERMINATION METHOD, DEVICE AND MEDIUM

CROSS-REFERENCE TO RELATED APPLICATION

This application is a national stage filing under 35 U.S.C. § 371 of international application number PCT/CN2020/141200, filed Dec. 30, 2020, which claims priority to Chinese patent application No. 202010026432.5 filed Jan. 10, 2020. The contents of these applications are incorporated herein by reference in their entirety.

TECHNICAL FIELD

The disclosure relates to the field of wireless communications, and specifically to a method and device for determining a time-domain resource, and a medium.

BACKGROUND

4th-Generation (4G) Long-Term Evolution (LTE)/Long-Term Evolution Advanced (LTE-A), and 5th-Generation (5G) are facing more and more demands. Both 4G and 5G systems are developing toward enhanced mobile broadband, ultra-high reliability, ultra-low latency transmission, and massive connections. In order to support the characteristics of ultra-high reliability and ultra-low latency transmission, it is necessary to improve reliability by performing repeated transmission at intervals of a short transmission time. Short transmission time internal may be a single or several Orthogonal Frequency Division Multiplexing (OFDM) symbols. A Physical Downlink Control Channel (PDCCH) is mainly used to carry scheduling information of downlink data transmission and scheduling information of uplink data transmission, notify a slot format, perform uplink power control, and so on. The more resources used to carry the PDCCH, the higher the transmission reliability. The resources include frequency-domain resources, i.e., resource blocks, and time-domain resources, i.e., time-domain symbols.

For some coverage-limited scenarios, when the frequency-domain resources have been occupied to the maximum, it is necessary to increase the coverage performance by adding time-domain symbols. However, for the scenarios where New Radio (NR) and LTE coexist, in the relevant mechanisms, NR requires the use of a continuous control resource set (CORESET) for indication. In a case that a collision occurs between NR and LTE time-domain symbols, as defined in the NR protocols, if a symbol of a PDCCH collides with a symbol of an LTE cell-specific reference signal (CRS), this PDCCH candidate will be terminated. As a result, only a few time-domain resources can be used to carry the PDCCH, reducing the reliability of PDCCH transmission.

SUMMARY

The disclosure provides a method and device for determining a time-domain resource and a medium, to ensure that the NR uses discontinuous time-domain symbols as time-domain resources for carrying a PDCCH in the case of coexistence of NR and LTE.

In accordance with a first aspect of the disclosure, an embodiment provides a method for determining a time-domain resource, which is applied to a base station. The method includes: obtaining a discontinuous CORESET signaling parameter in NR; and determining discontinuous time-domain symbols according to the discontinuous CORESET signaling parameter and transmitting the discontinuous time-domain symbols to a terminal, where the discontinuous time-domain symbols are used as time-domain resources for carrying a PDCCH.

In accordance with a second aspect of the disclosure, an embodiment provides a method for determining a time-domain resource, which is applied to a terminal. The method includes: obtaining discontinuous time-domain symbols determined by a base station side according to a discontinuous CORESET signaling parameter; and using the discontinuous time-domain symbols as time-domain resources for carrying a PDCCH.

In accordance with a third aspect of the disclosure, an embodiment provides a method for determining a time-domain resource, which is applied to a terminal. The method includes: obtaining a start position of a monitoring occasion and an occupied symbol value sent by a base station; obtaining a colliding symbol in response to a determination that a symbol collision occurs between NR and an LTE CRS; and determining discontinuous time-domain symbols according to the start position of the monitoring occasion, the occupied symbol value, and the colliding symbol, where the discontinuous time-domain symbols are time-domain resources for carrying a PDCCH.

In accordance with a fourth aspect of the disclosure, an embodiment provides a base station, including: one or more processors; and a memory, configured for storing one or more programs, where the one or more programs, when executed by the one or more processors, cause the one or more processors to perform the method provided in accordance with the first aspect of the disclosure.

In accordance with a fifth aspect of the disclosure, an embodiment provides a terminal, including: one or more processors; and a memory, configured for storing one or more programs, where the one or more programs, when executed by the one or more processors, cause the one or more processors to perform the method provided in accordance with the second aspect of the disclosure or the method provided in accordance with the third aspect of the disclosure.

In accordance with a sixth aspect of the disclosure, an embodiment provides a storage medium, storing a computer program which, when executed by a processor, causes the processor to perform any one of the methods provided in the embodiments of the disclosure.

According to the method and device for determining a time-domain resource and the medium provided in the embodiments of the disclosure, by obtaining a discontinuous CORESET signaling parameter in NR, determining discontinuous time-domain symbols according to the discontinuous CORESET signaling parameter and transmitting the discontinuous time-domain symbols to a terminal, the NR can use discontinuous time-domain symbols as time-domain resources for carrying a PDCCH in the case of coexistence of NR and LTE.

DETAILED DESCRIPTION

The embodiments of the disclosure will be described in detail with reference to the accompanying drawings. It is to be noted that if not in collision, the embodiments and features therein in the disclosure may be combined with each other.

Figure 1:
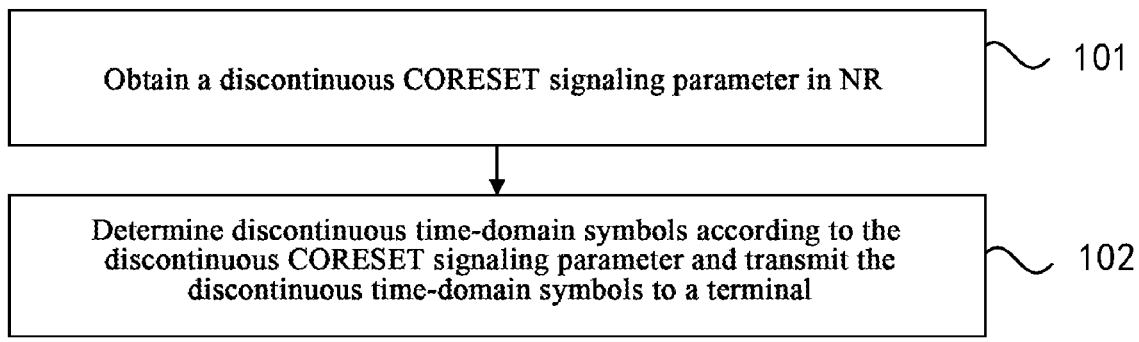
FIG. 1 is a flowchart of a method for determining a time-domain resource according to the disclosure.

In an example embodiment, FIG. 1 is a flowchart of a method for determining a time-domain resource according to the disclosure. The method may be applied to a case where NR uses discontinuous time-domain symbols as time-domain resources for carrying a PDCCH. The method may be performed by a base station provided in the disclosure.

As shown in FIG. 1, the flowchart of the method for determining a time-domain resource according to the disclosure includes the following steps S101 to S102.

At S101, a discontinuous CORESET signaling parameter in NR is obtained.

In an example, the obtaining a discontinuous CORESET signaling parameter in NR includes:

determining a time-domain symbol of an LTE frame structure occupied by a CRS on an antenna port; and generating the CORESET signaling parameter in NR according to the occupied time-domain symbol of the LTE frame structure.

Figure 2:
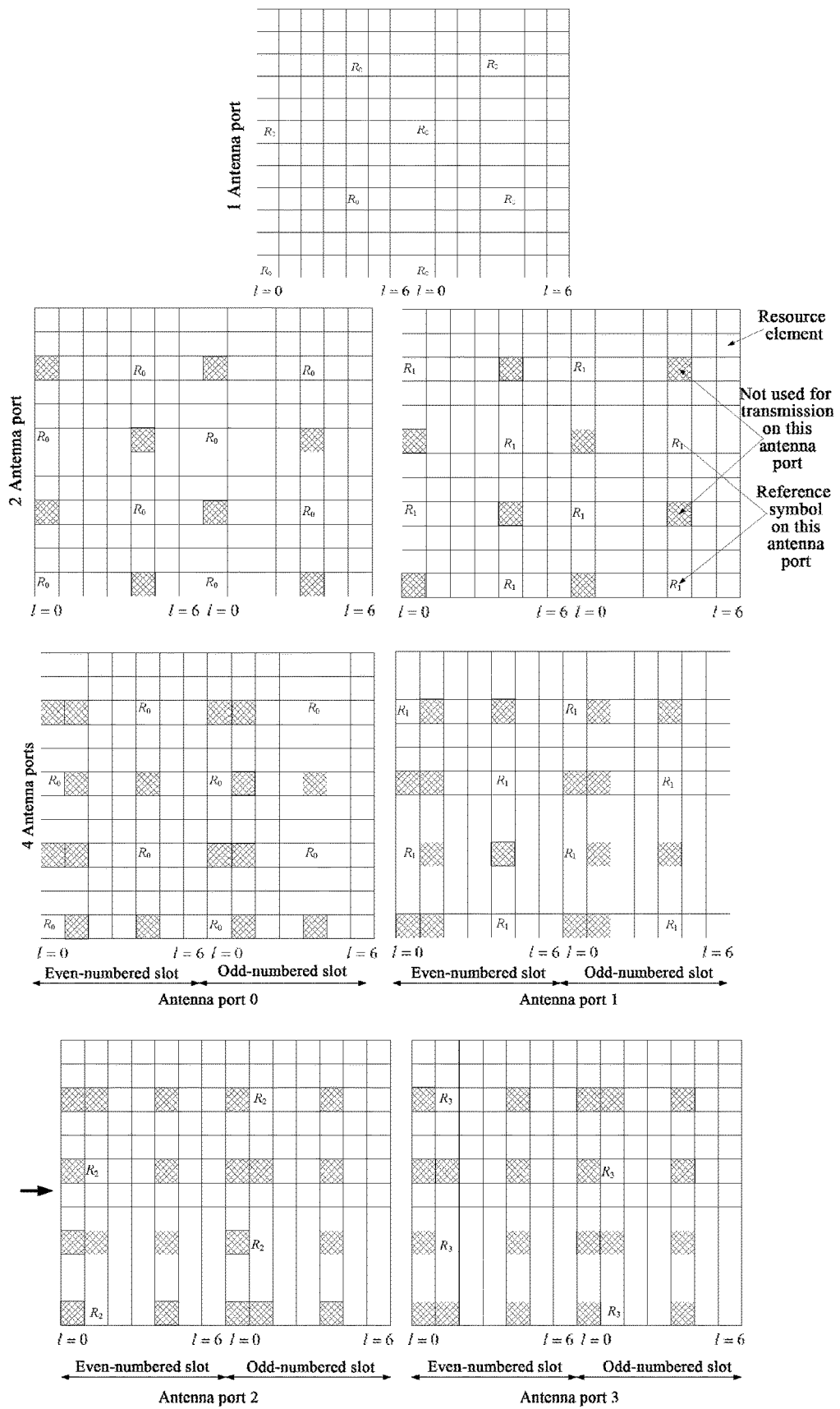
FIG. 2 is a schematic diagram of an LTE CRS according to the disclosure.

FIG. 2 is a schematic diagram of an LTE CRS, and no PDCCH can be sent on a symbol where the LTE CRS is located. It may be determined from FIG. 2 that time-domain symbols of the LTE frame structure occupied by the CRS on a 1/2-antenna port are 0/4/7/11, time-domain symbols of the LTE frame structure occupied by the CRS ON a 4-antenna port are 0/1/4/7/8/11, and the CORESET signaling parameter in NR is generated according to the occupied time-domain symbols of the LTE frame structure.

At S102, discontinuous time-domain symbols are determined according to the discontinuous CORESET signaling parameter and transmitted to a terminal.

The discontinuous time-domain symbols are used as time-domain resources for carrying a PDCCH.

In an example, the discontinuous CORESET signaling parameter includes: a start position of a monitoring occasion, and discontinuous symbols.

In an example, the determining discontinuous time-domain symbols according to the discontinuous CORESET signaling parameter includes: determining a position of a start symbol of the discontinuous time-domain symbols in an NR frame structure according to the start position of the monitoring occasion; determining, according to the discontinuous symbols, symbol positions and a length of symbols that are occupied by the discontinuous time-domain symbols in the NR frame structure.

In an example, the discontinuous CORESET signaling parameter includes: a start position of a monitoring occasion, an occupied symbol value, and discontinuous symbols.

In an example, the determining discontinuous time-domain symbols according to the discontinuous CORESET signaling parameter includes: determining a position of a start symbol of the discontinuous time-domain symbols in an NR frame structure according to the start position of the monitoring occasion; determining, according to the occupied symbol value, a length of symbols occupied by the discontinuous time-domain symbols in the NR frame structure; and determining, according to the discontinuous symbols, symbol positions occupied by the discontinuous time-domain symbols in the NR frame structure.

In an example, the discontinuous CORESET signaling parameter includes: a discontinuous symbol enable parameter, a discontinuous symbol determination parameter, and an occupied symbol value, where the discontinuous symbol enable parameter includes an enabled attribute or a disabled attribute.

In an example, the determining discontinuous time-domain symbols according to the discontinuous CORESET signaling parameter includes: in a case where a determination is made that the discontinuous symbol enable parameter is of the enabled attribute, the discontinuous symbol determination parameter indicates a start position of a monitoring occasion and a specific position of an occupied symbol; determining, according to the discontinuous symbol determination parameter, a position of a start symbol of the discontinuous time-domain symbols in an NR frame structure and symbol positions occupied by the discontinuous time-domain symbols; and determining, according to the occupied symbol value, a length of symbols occupied by the discontinuous time-domain symbols in the NR frame structure.

In an example, the discontinuous CORESET signaling parameter includes: a symbol colliding with the symbol occupied by the LTE CRS in NR, an offset, an occupied symbol value, and a start position of a monitoring occasion.

In an example, the determining discontinuous time-domain symbols according to the discontinuous CORESET signaling parameter includes: determining a position of a start symbol of the discontinuous time-domain symbols in an NR frame structure according to the start position of the monitoring occasion; determining, according to the occupied symbol value, a length of symbols occupied by the discontinuous time-domain symbols in the NR frame structure; and determining, according to the offset, a number of symbols by which the discontinuous time-domain symbols are offset backward in a case that the colliding symbol is encountered.

In an example, the discontinuous symbols are indicated by a bitmap or by a preset pattern.

For different contents included in the discontinuous CORESET signaling parameter, the method for determining the discontinuous time-domain symbols is described below with reference to difference cases respectively.

Case One:

When the discontinuous CORESET signaling parameter includes a start position of a monitoring occasion and discontinuous symbols, the start position of the monitoring occasion is represented by monitoringSymbolsWithinSlot, and the discontinuous symbols are represented by duration.

Figure 3:
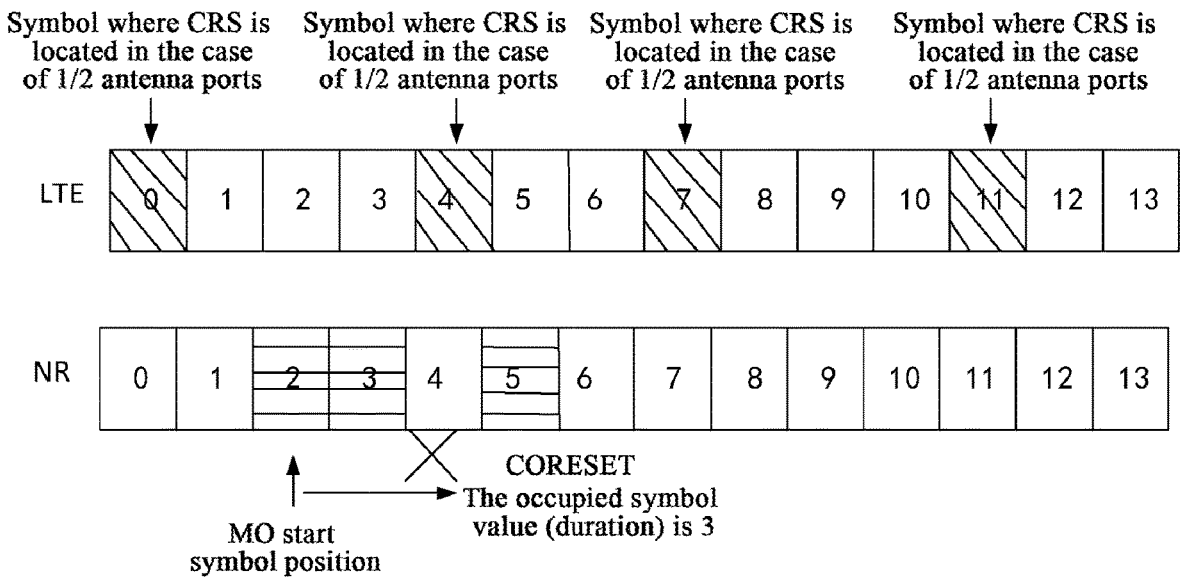
FIG. 3 is a schematic diagram of an LTE frame structure and an NR frame structure according to the disclosure.

FIG. 3 shows a schematic diagram of an LTE frame structure and an NR frame structure by taking 1/2 antenna ports as an example. The discontinuous symbol duration may be indicated by signaling BIT STRING (SIZE (14)), that is, indicated by a 14-bit bitmap, which may be set to 00110100000000. The start position monitoringSymbolsWithinSlot of the monitoring occasion may be set to 00100000000000. The start position of the monitoring occasion indicates that a start symbol of a PDCCH is 2, and the discontinuous symbols indicate that the occupied symbols are 2/3/5 and the length of symbols occupied is 3, thus avoiding symbol 4 which collides with LTE. The determined discontinuous time-domain symbols 2/3/5 are used as time-domain resources for carrying the PDCCH.

The discontinuous symbols may be indicated by a 14-bit bitmap as described above, and may also be indicated by a preset pattern, for example, preset patterns of the discontinuous symbols shown in Table 1 to Table 4 below. Any rows in Table 1 to Table 4 may be combined, and the disclosure is not limited to the use of only three bits to indicate eight states, which, for example, may be extended to the use of four bits to indicate 16 symbol patterns or the use of five bits to indicate 32 symbol patterns.

The discontinuous symbols may be in one of candidate preset patterns configured by Radio Resource Control (RRC). Preset Pattern1 may be represented by three bits 000. Pattern2 may be represented by three bits 001. Pattern3 may be represented by three bits 010. Pattern4 may be represented by three bits 011. Pattern5 may be represented by three bits 100. Pattern6 may be represented by three bits 101. Pattern7 may be represented by three bits 110. Pattern8 may be represented by three bits 111. Therefore, when a determination is made that the discontinuous symbols use Pattern4 in Table 1 represented by symbol 011, a further determination is made that the discontinuous symbols actually indicate 00110100000000, which can be represented by only three bits and does not need to occupy 14 bits. Such an indication method for the discontinuous symbols can reduce signaling overheads, thereby speeding up processing.

TABLE 1

| Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern1 | 0 | 0 | 1 | 0 | 0 | 0 | 0 | 0 | 0 | 0 | 0 | 0 | 0 | 0 |
| Pattern2 | 0 | 0 | 0 | 1 | 0 | 0 | 0 | 0 | 0 | 0 | 0 | 0 | 0 | 0 |
| Pattern3 | 0 | 0 | 1 | 1 | 0 | 0 | 0 | 0 | 0 | 0 | 0 | 0 | 0 | 0 |
| Pattern4 | 0 | 0 | 1 | 1 | 0 | 1 | 0 | 0 | 0 | 0 | 0 | 0 | 0 | 0 |
| Pattern5 | 0 | 0 | 1 | 1 | 0 | 1 | 1 | 0 | 0 | 0 | 0 | 0 | 0 | 0 |
| Pattern6 | 0 | 0 | 1 | 1 | 0 | 1 | 1 | 0 | 0 | 1 | 1 | 0 | 0 | 0 |
| Pattern7 | 0 | 0 | 1 | 1 | 0 | 1 | 1 | 0 | 0 | 1 | 1 | 0 | 1 | 1 |

TABLE 2

| Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern1 | 0 | 1 | 1 | 1 | 0 | 0 | 0 | 0 | 0 | 0 | 0 | 0 | 0 | 0 |
| Pattern2 | 0 | 1 | 1 | 1 | 0 | 1 | 0 | 0 | 0 | 0 | 0 | 0 | 0 | 0 |
| Pattern3 | 0 | 1 | 1 | 1 | 0 | 1 | 1 | 0 | 0 | 0 | 0 | 0 | 0 | 0 |
| Pattern4 | 0 | 1 | 1 | 1 | 0 | 1 | 1 | 1 | 0 | 0 | 0 | 0 | 0 | 0 |
| Pattern5 | 0 | 1 | 1 | 1 | 0 | 1 | 1 | 1 | 0 | 1 | 0 | 0 | 0 | 0 |
| Pattern6 | 0 | 1 | 1 | 1 | 0 | 1 | 1 | 1 | 0 | 1 | 1 | 0 | 0 | 0 |
| Pattern7 | 0 | 1 | 1 | 1 | 0 | 1 | 1 | 1 | 0 | 1 | 1 | 0 | 1 | 0 |
| Pattern8 | 0 | 1 | 1 | 1 | 0 | 1 | 1 | 1 | 0 | 1 | 1 | 0 | 1 | 1 |

TABLE 3

| Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern1 | 0 | 0 | 1 | 1 | 0 | 1 | 0 | 0 | 0 | 0 | 0 | 0 | 0 | 0 |
| Pattern2 | 0 | 0 | 0 | 1 | 0 | 1 | 1 | 0 | 0 | 0 | 0 | 0 | 0 | 0 |
| Pattern3 | 0 | 0 | 0 | 0 | 0 | 1 | 1 | 1 | 0 | 0 | 0 | 0 | 0 | 0 |
| Pattern4 | 0 | 0 | 0 | 0 | 0 | 0 | 1 | 1 | 0 | 1 | 0 | 0 | 0 | 0 |
| Pattern5 | 0 | 0 | 0 | 0 | 0 | 0 | 0 | 1 | 0 | 1 | 1 | 0 | 0 | 0 |
| Pattern6 | 0 | 0 | 0 | 0 | 0 | 0 | 0 | 0 | 0 | 1 | 1 | 0 | 1 | 0 |
| Pattern7 | 0 | 0 | 0 | 0 | 0 | 0 | 0 | 0 | 0 | 0 | 1 | 0 | 1 | 1 |

TABLE 4

| Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern1 | 0 | 0 | 1 | 1 | 0 | 1 | 0 | 0 | 0 | 0 | 0 | 0 | 0 | 0 |
| Pattern2 | 0 | 0 | 1 | 1 | 0 | 1 | 1 | 0 | 0 | 0 | 0 | 0 | 0 | 0 |
| Pattern3 | 0 | 0 | 1 | 1 | 0 | 1 | 1 | 1 | 0 | 0 | 0 | 0 | 0 | 0 |
| Pattern4 | 0 | 0 | 1 | 1 | 0 | 1 | 1 | 1 | 0 | 1 | 0 | 0 | 0 | 0 |
| Pattern5 | 0 | 0 | 1 | 1 | 0 | 1 | 1 | 1 | 0 | 1 | 1 | 0 | 0 | 0 |
| Pattern6 | 0 | 0 | 1 | 1 | 0 | 1 | 1 | 1 | 0 | 1 | 1 | 0 | 1 | 0 |
| Pattern7 | 0 | 0 | 1 | 1 | 0 | 1 | 1 | 1 | 0 | 1 | 1 | 0 | 1 | 1 |

Figure 4:
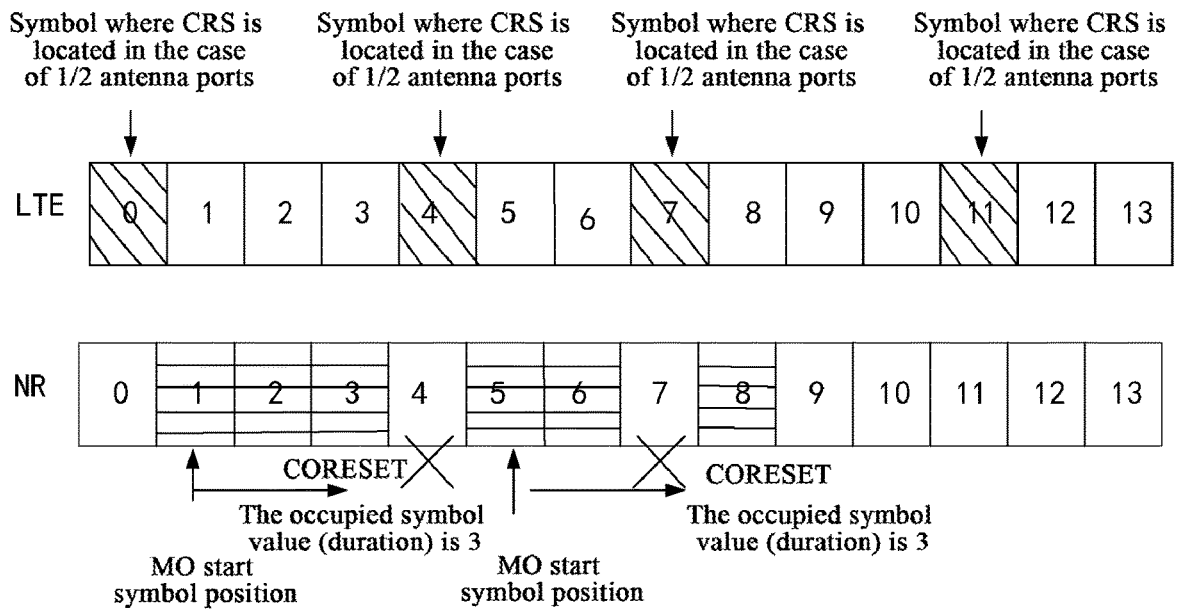
FIG. 4 is a schematic diagram of an LTE frame structure and an NR frame structure according to the disclosure.

It should be noted that the start position symbol of the monitoring occasion includes only one digit of 1, which indicates that the NR frame structure has one time-domain resource for carrying only one PDCCH. When the start position symbol of the start position of the monitoring occasion includes multiple digits of 1, it means that there are multiple monitoring occasions, and the NR frame structure has time-domain symbols for carrying multiple PDCCHs. FIG. 4 shows a schematic diagram of an LTE frame structure and an NR frame structure carrying multiple PDCCHs by taking 1/2 antenna ports as an example. The discontinuous symbols duration may be indicated by signaling BIT STRING (SIZE (14)), and may be set to 01110110100000. The start position monitoringSymbolsWithinSlot of the monitoring occasion may be set to 01000100000000. This means that symbols occupied by the first PDCCH monitoring occasion in a search space are 1/2/3, and the length of the symbols occupied is 3; symbols occupied by the second PDCCH monitoring occasion are 5/6/8, and the length of the symbols occupied is 3. The determined discontinuous time-domain symbols 1/2/3 and 5/6/8 are respectively used as time-domain resources for carrying the PDCCH.

It should be noted that the above embodiment is described using the example where the length of symbols occupied by two PDCCH monitoring occasions are identical and both are 3. For a case where one search space includes multiple monitoring occasions, the PDCCH monitoring occasions may also occupy different symbol lengths. For example, the start position monitoringSymbolsWithinSlot of the monitoring occasion may be set to 01000100000000, and the discontinuous symbols duration may be indicated by signaling BIT STRING (SIZE (14)), and may be set to 01100110100000. This means that symbols occupied by the first PDCCH monitoring occasion in a search space are 1/2, and the length of the symbols occupied is 2; symbols occupied by the second PDCCH monitoring occasion are 5/6/8, and the length of the symbols occupied is 3. The determined discontinuous time-domain symbols 1/2 and 5/6/8 are respectively used as time-domain resources for carrying the PDCCH.

Figure 5:
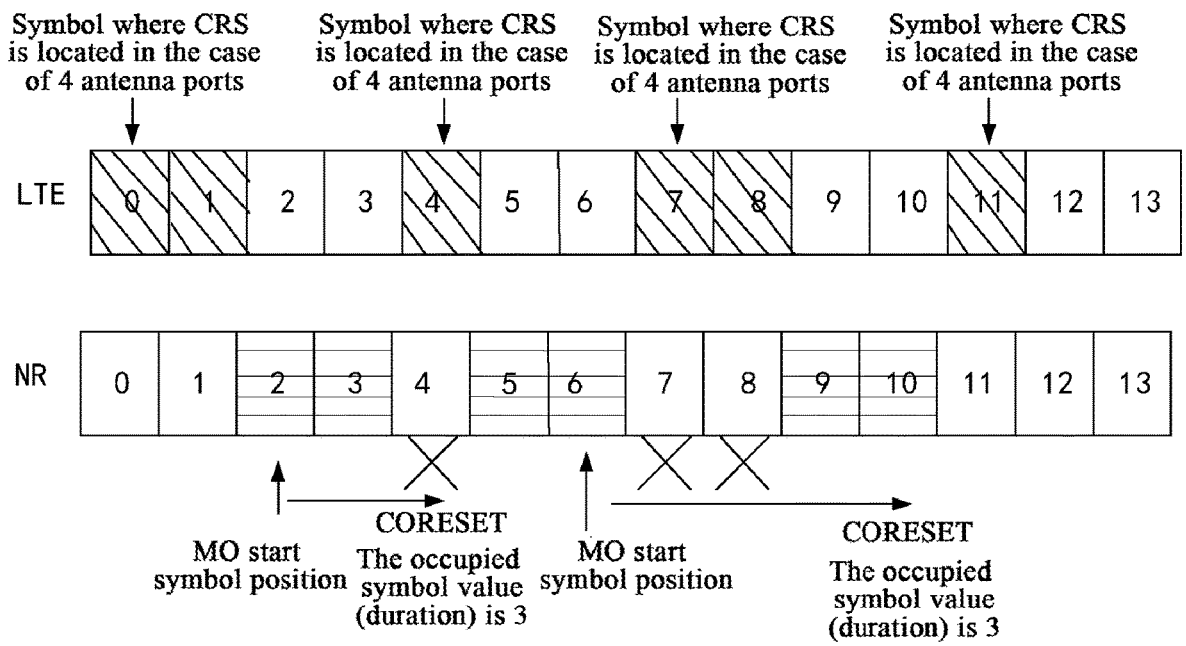
FIG. 5 is a schematic diagram of an LTE frame structure and an NR frame structure according to the disclosure.

It should be noted that the above description is given by taking 1/2 antenna ports as an example. The number of antenna ports may be increased. FIG. 5 shows a schematic diagram of an LTE frame structure and an NR frame structure carrying multiple PDCCHs by taking four antenna ports as an example. The discontinuous symbols duration may be indicated by signaling BIT STRING (SIZE (14)), and may be set to 00110110011000, and the start position of the monitoring occasion may be set to 00100010000000. This means that symbols occupied by the first PDCCH monitoring occasion in a search space are 2/3/5, and the length of the symbols occupied is 3; symbols occupied by the second PDCCH monitoring occasion are 6/9/10, and the length of the symbols occupied is 3. The determined discontinuous time-domain symbols 2/3/5 and 6/9/10 are respectively used as time-domain resources for carrying the PDCCH.

Case Two:

When the discontinuous CORESET signaling parameter includes a start position of a monitoring occasion, an occupied symbol value and discontinuous symbols, the start position of the monitoring occasion is represented by monitoringSymbolsWithinSlot, the occupied symbol value is represented by duration, and the discontinuous symbols are represented by location.

FIG. 3 shows a schematic diagram of an LTE frame structure and an NR frame structure by taking 1/2 antenna ports as an example. The discontinuous symbols location may be indicated by signaling BIT STRING (SIZE (14)), that is, indicated by a 14-bit bitmap, which may be set to 00110100000000. The occupied symbol value duration may be set to 3. The start position of the monitoring occasion monitoringSymbolsWithinSlot may be set to 00100000000000. A determination may be made based on the information of the above three parameters that the occupied symbols indicated by the discontinuous symbols are 2/3/5 and the length of symbols occupied is 3, thus avoiding symbol 4 which collides with LTE. The determined discontinuous time-domain symbols 2/3/5 are used as time-domain resources for carrying the PDCCH. Difference from Case One, in Case Two, the discontinuous symbols are only used to indicate the position of the symbols occupied by the discontinuous time-domain symbol, and are not used to indicate the length of the occupied symbols.

The discontinuous symbols may be indicated by a 14-bit bitmap as described above, and may also be indicated by a preset pattern, for example, the preset patterns of the discontinuous symbols shown in Table 1-Table 4 in Case One. However, information included in the discontinuous symbols specified by the preset patterns of the discontinuous symbols shown in Table 1 changes, i.e., is only used to indicate the position of the symbols occupied by the discontinuous time-domain symbols, and is not used to indicate the length of the occupied symbols.

It should be noted that the start position symbol of the monitoring occasion includes only one digit of 1, which indicates that the NR frame structure has a time-domain resource for carrying only one PDCCH. When the start position symbol of the start position of the monitoring occasion includes multiple digits of 1, it means that there are multiple monitoring occasions, and the NR frame structure has time-domain symbols for carrying multiple PDCCHs. FIG. 4 shows a schematic diagram of an LTE frame structure and an NR frame structure carrying multiple PDCCHs by taking 1/2 antenna ports as an example. The discontinuous symbols location may be indicated by signaling BIT STRING (SIZE (14)), and may be set to 01110110100000. The occupied symbol value duration may be set to 3. The start position monitoringSymbolsWithinSlot of the monitoring occasion may be set to 01000100000000. This means that symbols occupied by the first PDCCH monitoring occasion in a search space are 1/2/3, and the length of the symbols occupied is 3; symbols occupied by the second PDCCH monitoring occasion are 5/6/8, and the length of the symbols occupied is 3. The determined discontinuous time-domain symbols 1/2/3 and 5/6/8 are respectively used as time-domain resources for carrying the PDCCH.

It should be noted that when four antenna ports are used, only the position of the colliding symbol between NR and LTE is different from that in the case of 1/2 antenna ports, and the manner of determining discontinuous time-domain symbols is approximately the same as that in the case of 1/2 antenna ports, so the details will not be repeated in this embodiment.

Case Three:

When the discontinuous CORESET signaling parameter includes a discontinuous symbol enable parameter, a discontinuous symbol determination parameter and an occupied symbol value, where the discontinuous symbol enable parameter includes an enabled attribute or a disabled attribute, the discontinuous symbol enable parameter is represented by a symbol discontinuous, the discontinuous symbol determination parameter is represented by a symbol monitoringSymbolsWithinSlot, and the occupied symbol value is represented by duration.

When the value of discontinuous is ENUMERATED {enabled}, it means that the discontinuous symbol enable parameter is of the enabled attribute. In this case, the discontinuous symbol determination parameter monitoringSymbolsWithinSlot is not only used to indicate the start position of the PDCCH monitoring occasion, but is also used to indicate the specific position of the occupied symbols, to support the indication of discontinuous time-domain symbols. For example, FIG. 4 shows a schematic diagram of an LTE frame structure and an NR frame structure carrying multiple PDCCHs by taking 1/2 antenna ports as an example. The discontinuous symbol determination parameter monitoringSymbolsWithinSlot may be set to 01110110100000. The occupied symbol value duration may be set to 3. A determination may be made based on the above three parameters that symbols occupied by the first PDCCH monitoring occasion in a search space are 1/2/3, and the length of the symbols occupied is 3; symbols occupied by the second PDCCH monitoring occasion are 5/6/8, and the length of the symbols occupied is 3. The determined discontinuous time-domain symbols 1/2/3 and 5/6/8 are respectively used as time-domain resources for carrying the PDCCH.

It should be noted that in a case where a determination is made that the discontinuous symbol enable parameter discontinuous is of the disabled attribute, the discontinuous symbol determination parameter monitoringSymbolsWithinSlot can only be used to indicate the start position of the monitoring occasion, but cannot be used to indicate the specific position of the occupied symbols. The position of a start symbol of continuous time-domain symbols in an NR frame structure is determined according to the discontinuous symbol determination parameter monitoringSymbolsWithinSlot; and a length of symbols occupied by the continuous time-domain symbols in the NR frame structure is determined according to the occupied symbol value duration. The manner of determining the continuous time-domain symbols according to the above three parameters is not the focus of the disclosure, and therefore will not be described in detail in this embodiment.

It should be noted that when four antenna ports are used, only the position of the colliding symbol between NR and LTE is different from that in the case of 1/2 antenna ports, and the manner of determining discontinuous time-domain symbols is approximately the same as that in the case of 1/2 antenna ports, so the details will not be repeated in this embodiment.

Case Four:

When the discontinuous CORESET signaling parameter includes a symbol colliding with the symbol occupied by the LTE CRS in NR, an offset, an occupied symbol value and a start position of a monitoring occasion, the colliding symbol is represented by a symbol collidewithLTECRSsymbol, the offset is represented by a symbol offsetOfcollidesymbol, the occupied symbol value is represented by duration, and the start position of the monitoring occasion is represented by a symbol monitoringSymbolsWithinSlot.

FIG. 3 shows a schematic diagram of an LTE frame structure and an NR frame structure by taking 1/2 antenna ports as an example. The colliding symbol collidewithLTE-CRSsymbol may be indicated by signaling BIT STRING (SIZE (14)), that is, indicated by a 14-bit bitmap, which may be set to 00010000000000, to indicate that symbol 4 collides with the symbol occupied by the LTE CRS. The offset offsetOfcollidesymbol may be indicated by signaling INTEGER(N), which indicates that the offset is set to N, where a maximum value of N is 13. In this embodiment, N may be set to 1. The occupied symbol value duration may be set to 3. The start position monitoringSymbolsWithinSlot of the monitoring occasion may be set to 00100000000000. Therefore, a determination may be made according to the start position 00100000000000 of the monitoring occasion that the position of the starting symbol of the discontinuous time-domain symbols in the NR frame structure is symbol 2. A determination may be made according to the occupied symbol value duration that the symbol length occupied by the discontinuous time-domain symbols in the NR frame structure is 3, i.e., theoretically the discontinuous time-domain symbols should be 2/3/4 in a case that no collision occurs. However, a determination may be made according to the colliding symbol collidewithLTECRSsymbol that a collision occurs between NR and LTE CRS at symbol 4, and the discontinuous time-domain symbols need to be offset backward to ensure that the symbol length is 3. A determination may be made according to the offset offsetOfcollidesymbol that the offset is 1, i.e., offsetting backward by one symbol from the position of the colliding symbol, and a determination may be made that the newly added symbol is symbol 5. Therefore, a determination is made that the discontinuous time-domain symbols are 2/3/5, and the determined discontinuous time-domain symbols 2/3/5 are used as time-domain resources for carrying the PDCCH.

It should be noted that, the above method may also use processing of offsetting backward by one symbol by default, and the base station does not need to notify the offset.

It should be noted that when four antenna ports are used, only the position of the colliding symbol between NR and LTE is different from that in the case of 1/2 antenna ports, and the manner of determining discontinuous time-domain symbols is approximately the same as that in the case of 1/2 antenna ports, so the details will not be repeated in this embodiment.

According to the method for determining a time-domain resource provided in the embodiments of the disclosure, by obtaining a discontinuous control resource set CORESET signaling parameter in NR, determining discontinuous time-domain symbols according to the discontinuous CORESET signaling parameter and transmitting the discontinuous time-domain symbols to a terminal, the NR can use discontinuous time-domain symbols as time-domain resources for carrying a PDCCH in the case of coexistence of NR and LTE.

Figure 6:
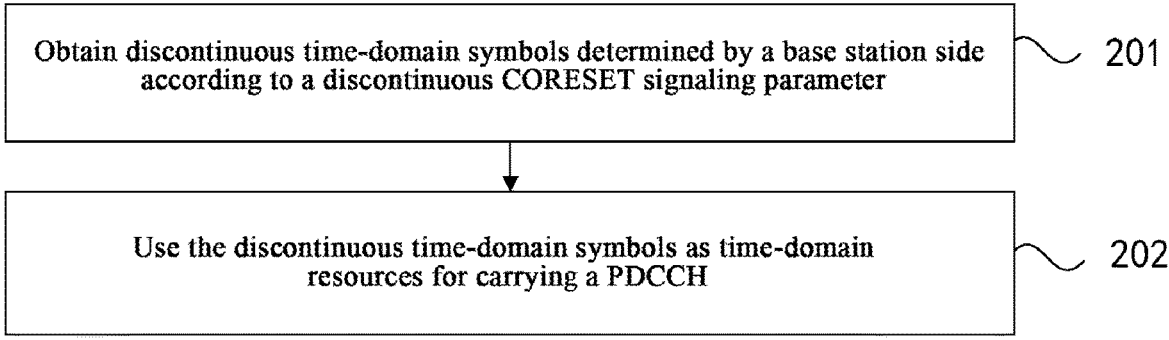
FIG. 6 is a flowchart of a method for determining a time-domain resource according to the disclosure.

In an embodiment, FIG. 6 is a flowchart of a method for determining a time-domain resource according to the disclosure. The method may be applied to a case where NR uses discontinuous time-domain symbols as time-domain resources for carrying a PDCCH. The method may be performed by a terminal provided in the disclosure. The method may include S201 to S202.

At S201, discontinuous time-domain symbols determined by a base station side are obtained according to a discontinuous CORESET signaling parameter.

In an implementation, the base station side determines the discontinuous time-domain symbols 2/3/5 according to the discontinuous CORESET signaling parameter, and the terminal obtains the discontinuous time-domain symbols 2/3/5 determined by the base station side, for example, by wireless transmission. The specific type of transmission between the terminal side and the base station side is not limited in the embodiment, and any type of transmission falls within the scope of protection of the disclosure as long as the terminal side can obtain the discontinuous time-domain symbols sent by the base station side.

At S202, the discontinuous time-domain symbols are used as time-domain resources for carrying a PDCCH.

After obtaining the discontinuous time-domain symbols 2/3/5 sent by the base station side, the terminal side uses the discontinuous time-domain symbols determined in the NR frame structure as time-domain resources for carrying the PDCCH, thereby solving the PDCCH coverage problem in the case of coexistence of NR and LTE.

Figure 7:
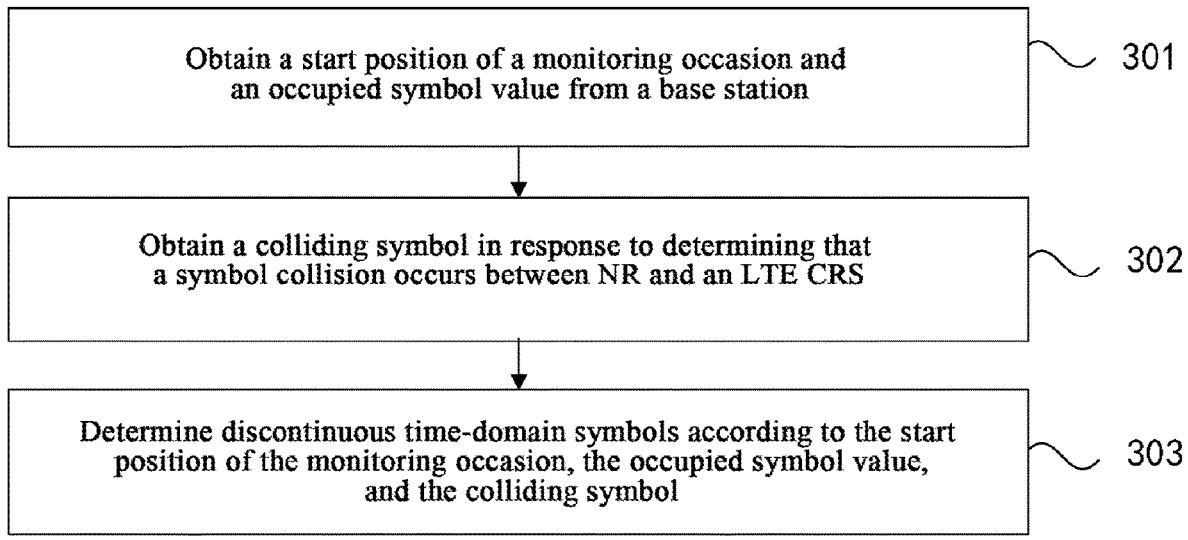
FIG. 7 is a flowchart of a method for determining a time-domain resource according to the disclosure.

In an embodiment, FIG. 7 is a flowchart of a method for determining a time-domain resource according to the disclosure. The method may be applied to a case where NR uses discontinuous time-domain symbols as time-domain resources for carrying a PDCCH. The method may be performed by a terminal provided in the disclosure.

As shown in FIG. 7, the flowchart of the method for determining a time-domain resource according to the disclosure includes the following steps S301 to S303.

At S301, a start position of a monitoring occasion and an occupied symbol value sent by a base station are obtained.

When a default mode is used, a terminal in NR may obtain a Decision Support System (DSS) working mode or other scenarios coexisting with LTE, and the terminal may know information about LTE transmit antenna ports. In this case, the terminal may obtain the start position and the occupied symbol value of the monitoring occasion that are sent by the base station, the start position of the monitoring occasion is represented by a symbol monitoringSymbolsWithinSlot, and the occupied symbol value is represented by duration.

FIG. 3 shows a schematic diagram of an LTE frame structure and an NR frame structure by taking 1/2 antenna ports as an example. The start position monitoringSymbolsWithinSlot of the monitoring occasion may be set to 00100000000000. The occupied symbol value duration may be set to 3.

At S302, a colliding symbol is obtained in the case of determining that a symbol collision occurs between NR and an LTE CRS.

In the embodiment, the terminal may obtain that the current mode is the DSS working mode and the transmit antenna port number is 2, and therefore determine that a symbol colliding with the LTE CRS is symbol 4, and use the obtained symbol 4 as the colliding symbol.

At S303, discontinuous time-domain symbols are determined according to the start position of the monitoring occasion, the occupied symbol value, and the colliding symbol, The discontinuous time-domain symbols are time-domain resources for carrying a PDCCH.

In an example, the determining discontinuous time-domain symbols according to the start position of the monitoring occasion, the occupied symbol value and the colliding symbol includes: determining a position of a start symbol of the discontinuous time-domain symbols in an NR frame structure according to the start position of the monitoring occasion; determining, according to the occupied symbol value, a length of symbols occupied by the discontinuous time-domain symbols in the NR frame structure; and occupying a nearest available symbol following the colliding symbol until the occupied symbol value is satisfied, in the case of determining that the colliding symbol is encountered.

In the embodiment, a determination may be made according to the start position monitoringSymbolsWithinSlot of the monitoring occasion that the position of the starting symbol of the discontinuous time-domain symbols in the NR frame structure is symbol 2. A determination may be made according to the occupied symbol value duration that the length of symbols occupied by the discontinuous time-domain symbols in the NR frame structure is 3; and a determination is made that the colliding symbol is symbol 4. In this case, starting from symbol 2, when a determination is made that colliding symbol 4 is encountered, the nearest available symbol after the colliding symbol 4, i.e., symbol 5, is occupied, until the requirement of the occupied symbol value 3 is met. Therefore, a determination is made that the determined discontinuous time-domain symbols are 2/3/5, and the determined discontinuous time-domain symbols 2/3/5 are used as time-domain resources for carrying the PDCCH.

Figure 8:
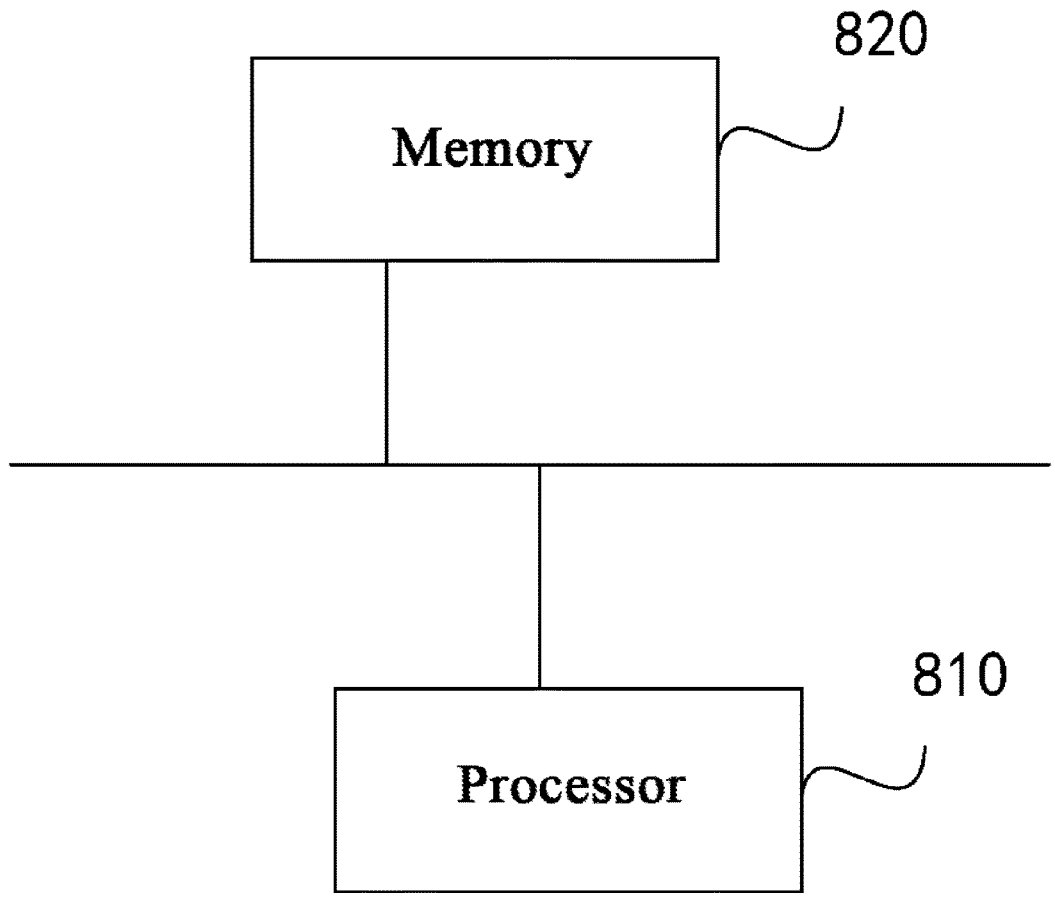
FIG. 8 is a schematic structural diagram of a base station according to the disclosure.

An embodiment of the disclosure provides a base station. FIG. 8 is a schematic structural diagram of a base station according to the disclosure. As shown in FIG. 8, the base station according to the disclosure includes: one or more processors 810 and a memory 820. The number of processors 810 in the base station may be one or more. FIG. 8 uses one processor 810 as an example. The memory 820 is configured for storing one or more programs. The one or more programs, when executed by the one or more processors 810, cause the one or more processors 810 to perform the method for determining a time-domain resource in the embodiments of the disclosure.

The processor 810 and the memory 820 in the base station may be connected by a bus or in other ways. Connection by a bus is used as an example in FIG. 8.

The memory 820, as a computer-readable storage medium, may be configured for storing software programs, computer-executable programs, and modules, for example, program instructions/modules corresponding to the method for determining a time-domain resource in the embodiments of the disclosure. The memory 820 may include a program storage area and a data storage area. The program storage area may store an operating system, and an application required by at least one function. The data storage area may store data created according to the use of the device and the like. In addition, the memory 820 may include a high-speed random access memory, and may also include a nonvolatile memory, e.g., at least one magnetic disk storage device, flash memory device, or other nonvolatile solid-state storage device. In some examples, the memory 820 may further include memories located remotely from the processor 810. Examples of the network include, but not limited to, the Internet, an intranet, a local area network, a mobile communication network, and combinations thereof.

Figure 9:
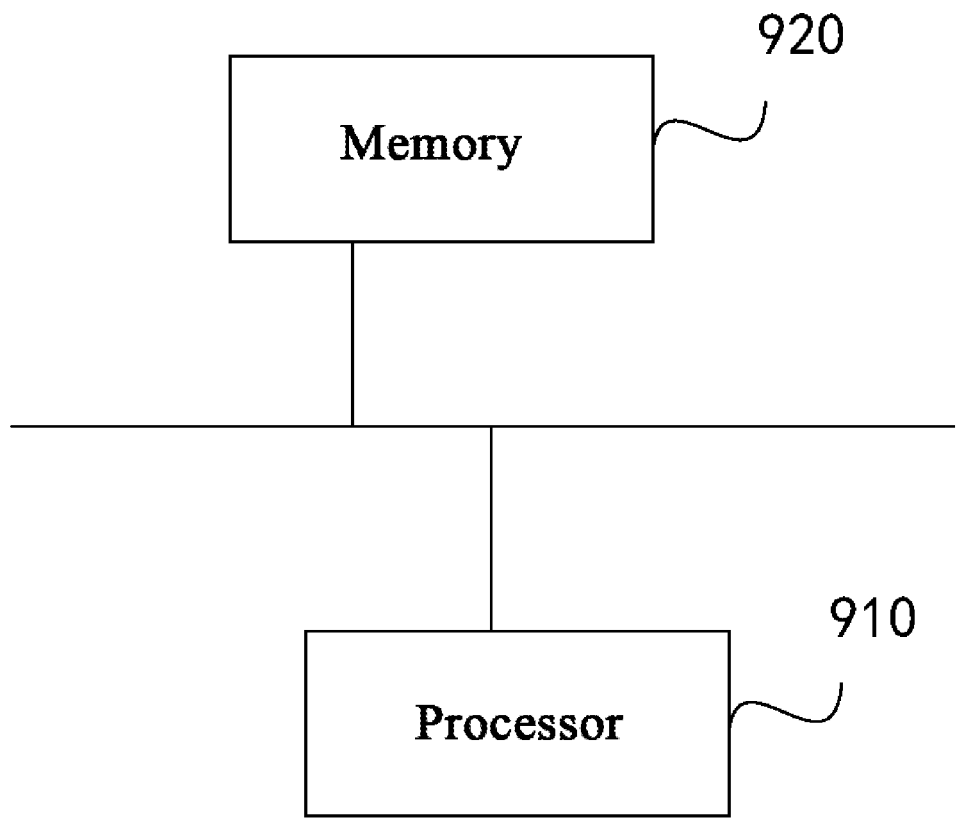
FIG. 9 is a schematic structural diagram of a terminal according to the disclosure.

An embodiment of the disclosure provides a terminal. FIG. 9 is a schematic structural diagram of a terminal according to the disclosure. As shown in FIG. 9, the terminal according to the disclosure includes: one or more processors 910 and a memory 920. The number of processors 910 in the base station may be one or more. FIG. 9 uses one processor 910 as an example. The memory 920 is configured for storing one or more programs. The one or more programs, when executed by the one or more processors 910, cause the one or more processors 910 to perform the method for determining a time-domain resource in the embodiments of the disclosure.

The processor 910 and the memory 920 in the terminal may be connected by a bus or in other ways. Connection by a bus is used as an example in FIG. 9.

The memory 920, as a computer-readable storage medium, may be configured for storing software programs, computer-executable programs, and modules, for example, program instructions/modules corresponding to the method for determining a time-domain resource in the embodiments of the disclosure. The memory 920 may include a program storage area and a data storage area. The program storage area may store an operating system, and an application required by at least one function. The data storage area may store data created according to the use of the device and the like. In addition, the memory 920 may include a high-speed random access memory, and may also include a nonvolatile memory, e.g., at least one magnetic disk storage device, flash memory device, or other nonvolatile solid-state storage device. In some examples, the memory 920 may further include memories located remotely from the processor 910. Examples of the network include, but not limited to, the Internet, an intranet, a local area network, a mobile communication network, and combinations thereof.

An embodiment of the disclosure also provides a storage medium, storing a computer program. The computer program, when executed by a processor, causes the processor to perform the method for determining a time-domain resource that is applied to a base station according to any one of the embodiments of the disclosure or the method for determining a time-domain resource that is applied to a terminal according to any one of the embodiments of the disclosure.

The method for determining a time-domain resource that is applied to the base station includes: obtaining a discontinuous CORESET signaling parameter in NR; and determining discontinuous time-domain symbols according to the discontinuous CORESET signaling parameter and transmitting the discontinuous time-domain symbols to a terminal, where the discontinuous time-domain symbols are used as time-domain resources for carrying a PDCCH.

The method for determining a time-domain resource that is applied to the terminal includes: obtaining discontinuous time-domain symbols determined by a base station side according to a discontinuous CORESET signaling parameter; and using the discontinuous time-domain symbols as time-domain resources for carrying a PDCCH.

Alternatively, the method for determining a time-domain resource that is applied to the terminal includes: obtaining a start position of a monitoring occasion and an occupied symbol value sent by a base station; obtaining a colliding symbol in the case of determining that a symbol collision occurs between NR and an LTE CRS; and determining discontinuous time-domain symbols according to the start position of the monitoring occasion, the occupied symbol value and the colliding symbol, where the discontinuous time-domain symbols are time-domain resources for carrying a PDCCH.

The above description is only illustrative of embodiments of the disclosure, and is not intended to limit the scope of the disclosure.

As will be understood by those having ordinary skill in the art, the term user terminal encompasses any suitable type of wireless user equipment, such as a mobile telephone, portable data processing device, portable web browser or vehicle-mounted mobile station.

In general, the various embodiments of the disclosure may be implemented in hardware or special purpose circuits, software, logic, or any combination thereof. For example, some aspects may be implemented in hardware, while other aspects may be implemented in firmware or software that can be executed by a controller, microprocessor or other computing device, but the disclosure is not limited thereto.

The embodiments of the disclosure may be implemented by the execution of computer program instructions by a data processor of a physical device, for example, in a processor entity, or by hardware, or by a combination of software and hardware. The computer program instructions may be assembly instructions, Instruction Set Architecture (ISA) instructions, machine instructions, machine dependent instructions, microcode, firmware instructions, state setting data, or source code or object code written in any combination of one or more programming languages.

The block diagram of any logic flow in the accompanying drawings of the disclosure may represent program steps, or may represent interconnected logic circuits, modules and functions, or may represent a combination of program steps and logic circuits, modules and functions. The computer program may be stored in a memory. The memory may be of any type suitable for the local technical environment and may be implemented using any suitable data storage technology, such as, but not limited to, Read-Only Memory (ROM), Random Access Memory (RAM), and optical storage devices and systems (Digital Video Disc (DVD) or Compact Disk (CD)), etc. The computer-readable medium may include a non-transitory storage medium. The data processor may be of any type suitable for the local technical environment, such as, but not limited to, a general purpose computer, a special purpose computer, a microprocessor, a Digital Signal Processor (DSP), an Application Specific Integrated Circuit (ASIC), a programmable logic device (Field-Programmable Gate Array (FPGA)), and a processor based on a multi-core processor architecture.

The invention claimed is:

1. A method for determining a time-domain resource, applied to a base station, the method comprising:
    obtaining a discontinuous control resource set (CORESET) signaling parameter in New Radio (NR); and
    determining discontinuous time-domain symbols according to the discontinuous CORESET signaling parameter and transmitting the discontinuous time-domain symbols to a terminal,
        wherein the discontinuous time-domain symbols are used as time-domain resources for carrying a physical downlink control channel (PDCCH);
        wherein the discontinuous CORESET signaling parameter comprises one of:
            a start position of a monitoring occasion, and discontinuous symbols;
            a start position of a monitoring occasion, an occupied symbol value, and discontinuous symbols;
            a discontinuous symbol enable parameter, a discontinuous symbol determination parameter, and an occupied symbol value, wherein the discontinuous symbol enable parameter comprises an enabled attribute or a disabled attribute; or
            a symbol in NR colliding with the symbol occupied by the LTE CRS, an offset, an occupied symbol value, and a start position of a monitoring occasion.

2. The method of claim 1, wherein the obtaining a discontinuous CORESET signaling parameter in NR comprises:
    determining a time-domain symbol of a Long-Term Evolution (LTE) frame structure occupied by a cell-specific reference signal (CRS) on an antenna port; and
    generating the CORESET signaling parameter in NR according to the occupied time-domain symbol of the LTE frame structure.

3. The method of claim 1, wherein the discontinuous CORESET signaling parameter comprises a start position of a monitoring occasion, and discontinuous symbols, and the determining discontinuous time-domain symbols according to the discontinuous CORESET signaling parameter comprises:
  determining a position of a start symbol of the discontinuous time-domain symbols in an NR frame structure according to the start position of the monitoring occasion; and
  determining, according to the discontinuous symbols, symbol positions and a length of symbols occupied by the discontinuous time-domain symbols in the NR frame structure.

4. The method of claim 1, wherein the discontinuous CORESET signaling parameter comprises a start position of a monitoring occasion, an occupied symbol value, and discontinuous symbols, and the determining discontinuous time-domain symbols according to the discontinuous CORESET signaling parameter comprises:
  determining a position of a start symbol of the discontinuous time-domain symbols in an NR frame structure according to the start position of the monitoring occasion;
  determining, according to the occupied symbol value, a length of symbols occupied by the discontinuous time-domain symbols in the NR frame structure; and
  determining, according to the discontinuous symbols, symbol positions occupied by the discontinuous time-domain symbols in the NR frame structure.

5. The method of claim 1, wherein the discontinuous CORESET signaling parameter comprises a discontinuous symbol enable parameter, a discontinuous symbol determination parameter, and an occupied symbol value, wherein the discontinuous symbol enable parameter comprises an enabled attribute or a disabled attribute, and the determining a discontinuous time-domain symbol according to the discontinuous CORESET signaling parameter comprises:
  in response to a determination that the discontinuous symbol enable parameter is of the enabled attribute, the discontinuous symbol determination parameter indicates a start position of a monitoring occasion and a position of an occupied symbol;
  determining, according to the discontinuous symbol determination parameter, a position of a start symbol of the discontinuous time-domain symbols in an NR frame structure and symbol positions occupied by the discontinuous time-domain symbols; and
  determining, according to the occupied symbol value, a length of symbols occupied by the discontinuous time-domain symbols in the NR frame structure.

6. The method of claim 1, wherein the discontinuous CORESET signaling parameter comprises a symbol in NR colliding with the symbol occupied by the LTE CRS, an offset, an occupied symbol value, and a start position of a monitoring occasion, and the determining discontinuous time-domain symbols according to the discontinuous CORESET signaling parameter comprises:
  determining a position of a start symbol of the discontinuous time-domain symbols in an NR frame structure according to the start position of the monitoring occasion;
  determining, according to the occupied symbol value, a length of symbols occupied by the discontinuous time-domain symbols in the NR frame structure; and
  determining, according to the offset, a number of symbols by which the discontinuous time-domain symbols are offset backward in response to the colliding symbol being encountered.

7. The method of claim 3, wherein the discontinuous symbols are indicated by a bitmap or by a preset pattern.

8. A method for determining a time-domain resource, applied to a terminal, the method comprising:
  obtaining discontinuous time-domain symbols determined by a base station side according to a discontinuous control resource set (CORESET) signaling parameter; and
  using the discontinuous time-domain symbols as time-domain resources for carrying a physical downlink control channel (PDCCH);
  wherein the discontinuous CORESET signaling parameter comprises one of:
    a start position of a monitoring occasion, and discontinuous symbols;
    a start position of a monitoring occasion, an occupied symbol value, and discontinuous symbols;
    a discontinuous symbol enable parameter, a discontinuous symbol determination parameter, and an occupied symbol value, wherein the discontinuous symbol enable parameter comprises an enabled attribute or a disabled attribute; or
    a symbol in NR colliding with the symbol occupied by the LTE CRS, an offset, an occupied symbol value, and a start position of a monitoring occasion.

9. A method for determining a time-domain resource, applied to a terminal, the method comprising:
  obtaining a start position of a monitoring occasion and an occupied symbol value from a base station;
  obtaining a colliding symbol in response to a determination that a symbol collision occurs between New Radio (NR) and a Long-Term Evolution (LTE) CRS; and
  determining discontinuous time-domain symbols according to the start position of the monitoring occasion, the occupied symbol value, and the colliding symbol,
    wherein the discontinuous time-domain symbols are time-domain resources for carrying a physical downlink control channel (PDCCH);
    wherein the determining discontinuous time-domain symbols according to the start position of the monitoring occasion, the occupied symbol value, and the colliding symbol comprises:
    determining a position of a start symbol of the discontinuous time-domain symbols in an NR frame structure according to the start position of the monitoring occasion;
    determining, according to the occupied symbol value, a length of symbols occupied by the discontinuous time-domain symbols in the NR frame structure; and
    occupying a nearest available symbol following the colliding symbol until the occupied symbol value is satisfied, in response to a determination that the colliding symbol is encountered.

10. A base station, comprising:
one or more processors; and
a memory, configured for storing one or more programs, wherein the one or more programs, when executed by the one or more processors, cause the one or more processors to perform the method of claim 1.

11. A terminal, comprising:
one or more processors; and
a memory, configured for storing one or more programs, wherein the one or more programs, when executed by the one or more processors, cause the one or more processors to perform the method of claim 8.

12. A non-transitory computer-readable storage medium, storing a computer program which, when executed by a processor, causes the processor to perform the method of claim 1.

13. A terminal, comprising:
   one or more processors; and
   a memory, configured for storing one or more programs, wherein the one or more programs, when executed by the one or more processors, cause the one or more processors to perform the method of claim 9.

14. A non-transitory computer-readable storage medium, storing a computer program which, when executed by a processor, causes the processor to perform the method of claim 8.

15. A non-transitory computer-readable storage medium, storing a computer program which, when executed by a processor, causes the processor to perform the method of claim 9.

* * * * *